(12) United States Patent
Menendez et al.

(10) Patent No.: US 8,929,365 B2
(45) Date of Patent: Jan. 6, 2015

(54) EFFICIENT, FAULT-TOLERANT MULTICAST NETWORKS VIA NETWORK CODING

(75) Inventors: Ronald Charles Menendez, Chatham, NJ (US); Joel Wright Gannett, Atlantic Highlands, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 796 days.

(21) Appl. No.: 12/390,946

(22) Filed: Feb. 23, 2009

(65) Prior Publication Data

US 2009/0213854 A1 Aug. 27, 2009

Related U.S. Application Data

(60) Provisional application No. 61/066,502, filed on Feb. 21, 2008.

(51) Int. Cl.
| | | |
|---|---|---|
| *H04L 12/28* | (2006.01) | |
| *H04J 14/00* | (2006.01) | |
| *H04L 1/00* | (2006.01) | |
| *H04B 7/155* | (2006.01) | |
| *H04L 12/701* | (2013.01) | |
| *H04L 12/707* | (2013.01) | |
| *H04L 12/703* | (2013.01) | |

(52) U.S. Cl.
CPC .......... *H04L 1/0041* (2013.01); *H04B 7/15521* (2013.01); *H04L 45/00* (2013.01); *H04L 45/24* (2013.01); *H04L 45/28* (2013.01); *H04L 2001/0097* (2013.01)
USPC ........................................... 370/389; 370/390

(58) Field of Classification Search
CPC .......................... H04J 14/0278; H04J 14/0254
USPC .................... 12/352, 389, 390, 400; 375/260; 370/352, 389, 390, 400
See application file for complete search history.

(56) References Cited

U.S. PATENT DOCUMENTS

| | | | |
|---|---|---|---|
| 2002/0057861 A1 * | 5/2002 | Ge et al. ........................ 385/16 |
| 2002/0085251 A1 * | 7/2002 | Ofek et al. .................... 359/117 |
| 2003/0235216 A1 | 12/2003 | Gustin | |
| 2004/0213229 A1 * | 10/2004 | Chang et al. .................. 370/390 |
| 2004/0234262 A1 * | 11/2004 | Bortz .............................. 398/45 |
| 2004/0258131 A1 * | 12/2004 | Margon ....................... 375/130 |
| 2005/0220096 A1 | 10/2005 | Friskney | |
| 2007/0071449 A1 * | 3/2007 | Kang ........................... 398/161 |
| 2007/0081603 A1 | 4/2007 | Jang | |
| 2007/0297391 A1 * | 12/2007 | Furukawa et al. ............ 370/352 |
| 2008/0134266 A1 * | 6/2008 | Kang ........................... 725/110 |

OTHER PUBLICATIONS

Network Information Flow. R. Ahlswede, N. Cai, S.-Y. R. Li and R. W. Yeung in IEEE Transactions on Information Theory, vol. 46, No. 4, pp. 1204-1216; Jul. 2000.

(Continued)

*Primary Examiner* — Brandon Renner (57) ABSTRACT

Fault-tolerant multicast networks via network coding comprises a digital signal operator that combines data signals multicast from multiple sources and transmits the combined data signal via a link to the next or destination node. In one aspect, the digital signal operator includes an exclusive-OR operator that performs a Boolean exclusive-OR function on the received bit streams of the multicast data from the plurality of sources.

22 Claims, 4 Drawing Sheets

(56) References Cited

OTHER PUBLICATIONS

Linear Network Coding. S.-Y. R. Li, R. W. Yeung and N. Cai in IEEE Transactions on Information Theory, vol. 49, No. 2, pp. 371-381; Feb. 2003.

An Algebraic Approach to Network Coding. R. Koetter and M. Medard in IEEE/ACM Transactions on Networking, vol. 11, No. 5, pp. 782-795; Oct. 2003.

Polynomial Time Algorithms for Multicast Network Code Construction. S. Jaggi, P. Sanders, P. A. Chou, M. Effros, S. Egner, K. Jain and L.M.G.M. Tolhuizen in IEEE Transactions on Information Theory, vol. 51, No. 6, pp. 1973-1982; Jul. 2003.

A Random Linear Network Coding Approach to Multicast. T. Ho, M. Médard, R. Koetter, D. R. Karger, M. Effros, J. Shi and B. Leong in IEEE Transactions on Information Theory, vol. 52, No. 10, pp. 4413-4430; Oct. 2006.

1+N Protection in Mesh Networks Using Network Coding over p-Cycles—A. Kamal. Proc. IEEE Globecom 2006.

Network Coding: An Instant Primer. C. Fragouli, J-Y Le Boudec, and J. Widmer. ACM SIGCOMM Computer Communication Review, Jan. 2006.

All-Optical Xor Logic Gates: Technologies and Experiment Demonstrations, by Min Zhang, Ling Wang, and Peida Ye, IEEE Optical Communications Magazine, May 2005.

Efficient, Fault-Tolerant All-Optical Multicast Networks via Network Coding, by Ronald C. Menendez and Joel W. Gannett.

International Search Report dated Apr. 3, 2009.

\* cited by examiner

EFFICIENT, FAULT-TOLERANT MULTICAST NETWORKS VIA NETWORK CODING

CROSS-REFERENCE TO RELATED APPLICATIONS

This application claims the benefit of U.S. Provisional Application No. 61/066,502, filed on Feb. 21, 2008, which is incorporated by reference herein in its entirety.

FIELD OF THE INVENTION

The present disclosure relates generally to fault-tolerant digital multicast networks.

BACKGROUND OF THE INVENTION

An optical network refers to a network based on optical technologies and, for example, using optical fibers as transmission medium. An all-optical network is a communication network that transports and routes signals completely in the optical domain. Such a network uses optical components such as optical switches and amplifiers connected by optical fibers. Most optical networks implement optical-electrical-optical (OEO) switches, which convert photons (optical signals) from the input side to electrons or electrical signals internally to perform the switching or processing, and then convert back to photons (optical signals) on the output side for the next leg of the transmission. The optical-to-electrical and electrical-to-optical conversions require extra power, creating extra burdens on the heat dissipation systems that are critical to the proper functioning of complex, high-capacity broadband routers and switches located in data centers. In addition, delays are introduced as electrical signals are moved up the protocol stack and processed by software or firmware. An all-optical fiber-optic switching device maintains the signal as light from input to output, thereby avoiding OEO conversions. Optical switches may separate signals at different wavelengths and direct them to different ports.

Considering the amount of data carried by optical fibers in optical networks, a loss or failure of even a single link could create a huge impact in servicing users. For instance, a link failure may occur as a result of the failure of a component such as the transmitter, the receiver, or the transmission medium (e.g., the fiber), etc. Therefore, it is highly desirable that an optical network be fault-tolerant. Conventional optical networks use redundant protection fiber links to protect against working link failures. However, installing and maintaining extra protection links is costly. For instance, conventional multicast network protection is achieved by having the central source node include parallel working and protection communication paths to nodes. The paths are used to send these nodes protection copies of the independent digital broadcast signals from the source nodes. These parallel communication paths from the central node are expensive, requiring separate hardware transmitters, separate receivers, and separate communication channels on the transmission medium.

In a communication network, nodes (e.g., computers, routers, or like) can act as relay nodes in which the nodes pass on information from a source node to other nodes until the information reaches the destination node. Network coding allows performing computations on the data received at intermediate network nodes before passing on the result of that computation. That is, rather than simply forwarding the data, the intermediate network nodes may combine several input packets or data streams, for instance, as a combination of previously received information, into one or several output packets or data streams.

Currently existing or known fault-tolerant network designs do not use the concept of network coding, in which information is distributed spatially on common communication channels. The focus of research and design in the fault-tolerant network arena has typically been with the concept that information must be carried in channels separated physically or spectrally, or information can be combined into one channel only if it is separated temporally such as with queuing in packet networks.

BRIEF SUMMARY OF THE INVENTION

Method and system for providing a digital fault-tolerant multicast network are disclosed. A method for providing a fault-tolerant multicast network, in one aspect, may comprise receiving at a node having a digital operator, a plurality of data multicast from a plurality of source nodes.

The method may further include combining the plurality of data using the digital operator and transmitting the combined data to one or more protected nodes.

A method for providing a fault-tolerant digital multicast network, in another aspect, may comprise receiving at a node having a digital operator, a plurality of data streams multicast from a plurality of source nodes, and receiving at the node a protected data stream. The method may also include recovering one of the plurality of data streams multicast from a plurality of source nodes by using the digital operator to perform a predetermined digital operation on the plurality of data streams and the protected data stream.

Yet in another aspect, a method for providing a fault-tolerant digital multicast network may comprise receiving at a node having a digital operator, first data multicast from a first source to at least a first receiving node and a second receiving node. The method may further include receiving at the node second data multicast from a second source to at least the first receiving node and the second receiving node. The method may yet further include combining the first data and the second data using the digital operator at the node, and sending the combined first data and the second data at least to the first receiving node via a link between the node and the first receiving node.

A fault-tolerant digital multicast network system, in one aspect, may comprise a plurality of nodes receiving and sending data. The plurality of nodes includes at least a first receiving node, a second receiving node, a first source and a second source. The system may further include a digital operator element implemented in at least one of the plurality of nodes. The digital operator element combines first data and second data, the first data being multicast from the first source to at least the first receiving node and the second receiving node and the second data being multicast from the second source to at least the first receiving node and the second receiving node. The combined first data and the second data are sent to the first receiving node via a link between at least one of the plurality of nodes and the first receiving node.

A program storage device readable by a machine, tangibly embodying a program of instructions executable by the machine to perform methods described herein may also be provided.

Further features as well as the structure and operation of various embodiments are described in detail below with ref-

DETAILED DESCRIPTION

In the present disclosure, network coding is used to enhance communication networks, for instance, multicast networks carrying data in digital format, so that they are fault tolerant and continue to operate with more efficient use of network resources and without service interruption as much as possible when component or link failures occur. In a multicast network, a source sends identical information to a group of destinations simultaneously. A method is disclosed in one embodiment that is based on network coding that provides fault tolerance in multicast networks. A network coding device may be implemented as a hardware device that performs, for example, bitwise operations on data. The terminology "data", "data stream" and "data packets" are used in this disclosure interchangeably and refers to streams of data communicated in a communication network. In one aspect, an exclusive-OR device performs a bitwise exclusive-OR function to achieve network coding. The exclusive-OR device may be an electronic device. In another aspect, the exclusive-OR device may be a photonic exclusive-OR device. The present disclosure, however, does not limit the network coding function to an exclusive-OR function. Rather, functions other than an exclusive-OR function may be used.

In addition, in the present disclosure, the terms "bit" and "bitwise" are not meant to be restrictive to binary (mod-2) digital systems, as the claims and the description in this application apply to any M-ary (mod-M) digital system.

Yet in another aspect, the fault tolerance in multicast networks may be provided in a manner that is all-optical. Network coding may be accomplished in the optical (photonic) domain with no need to convert to and from the electronic domain.

The method of the present disclosure is simpler than the known methods, in that it does not require complex distributed switching protocols, and efficient in that it does not require as many transmission channels as known methods. Network coding advantageously combines independent streams of information simultaneously on the same communication channel.

Network coding improves network throughput and robustness. Unlike nodes in traditional data network paradigms, the network coding node does not merely forward information. Instead, the network coding node sends out a data stream that may be a function of previously received data. This temporal and spatial spreading of information enables network coding to improve network robustness efficiently.

Figure 1:
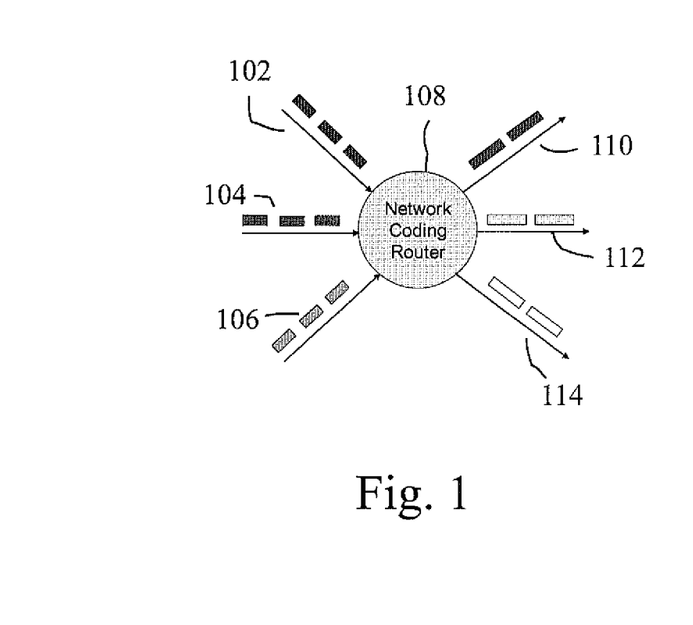
FIG. 1 illustrates a network coding router schema.

A network coding router may calculate a combination (e.g., a linear combination) of multiple packets that were received and stored previously, and as a result of this calculation it may create one or more new packets or data streams to be forwarded to adjoining nodes. In the present disclosure, the terminology "linear" refers to a function that can be used to combine data and to recover the original data from the combined data. For instance, an Exclusive-OR is considered a "linear" function. Exclusive-OR preserves information, so that if A is known and (A xor B) is known, then B can be recovered by Exclusive-OR'ing A and (A xor B). This is illustrated in FIG. 1, where the input packets or data streams 102, 104, 106 at a network coding router 108 may result in output packets or data streams 110, 112, 114 that differ from the input packets or data streams in bit pattern, size, and number. With proper design, the network coding node at the recipient's location may then recover the data intended for the recipient from the combination of the data streams from multiple adjoining nodes. In the event of a failure in the network that interrupts the flow of a signal, nodes receiving that signal in a properly-designed fault-tolerant network will be able to reconstruct that desired signal from computed data streams they receive over different paths.

Previous research on network coding assumed that arbitrarily complex data manipulation calculations can be executed at each node to achieve the benefits of the paradigm. In a practical sense, such schemes may apply only to electronic networks because only the electronic domain supports such elaborate calculations.

Figure 2:
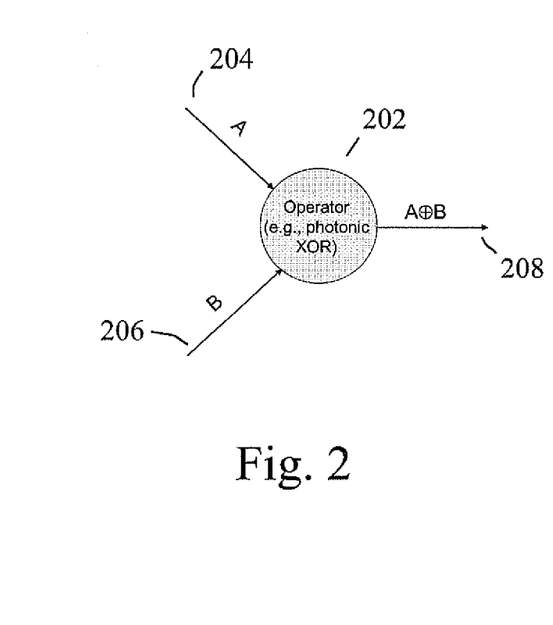
FIG. 2 illustrates a digital operator element in one embodiment of the present disclosure.

In the present disclosure in one embodiment, a bitwise exclusive-OR (XOR) hardware element is developed for network coding in multicast networks. The bitwise XOR hardware element of the present disclosure, for example, may be used in multicast networks, and/or optical multicast networks including but not limited to all-optical multicast networks. The bitwise XOR element may be a photonic bitwise XOR hardware element, or an electronic bitwise XOR element. In the case of a photonic element, OEO conversions may be avoided and data may be kept in the photonic domain. FIG. 2 illustrates a digital operator, for example, a bitwise exclusive-OR (XOR) hardware element in one embodiment of the present disclosure. The bitwise XOR hardware element performs an exclusive-OR function on the input streams. In the case when the bitwise XOR hardware element is a photonic bitwise exclusive-OR (XOR) hardware element, the element 202 takes two or more photonic bit streams (with bit transitions aligned) 204, 206 as input, and produces as its output a single photonic bit stream 208 that is the logical XOR of the input streams. This encoding may be accomplished without OEO conversions. However, even if such a device violates the all-optical paradigm by executing OEO conversions, there are other advantages and benefits for implementing an operator element such as the one shown in FIG. 2. Using a network coding functionality such as the basic XOR functionality, information spreading is obtained that can benefit the performance and efficiency of multicast networks.

A digital operator shown at 202, for example, performs digital functions on the input data streams. For instance, the digital operator element 202 may be a photonic XOR hardware element that performs bitwise Boolean XOR directly on the optical inputs, producing an optical output. Photonic logic uses photons (light) in logic gates (AND, NAND, OR, NOR, XOR, XNOR). Photonic logic refers to the use of light (photons) to form logic gates. In one embodiment, photonic XOR element 202 may comprise various configurations of optical elements such as optical splitters and semiconductor optical amplifiers. A photonic XOR logic gate such as those described in "All-Optical Xor Logic Gates: Technologies And Experiment Demonstrations," by Min Zhang, Ling Wang, and Peida Ye, *IEEE Optical Communications Magazine*, May 2005, may be used to implement the system and method of the present disclosure. That publication is incorporated herein by reference in its entirety. As described above, the operator shown at 202 may also be an electrical and/or electronic digital operator such as Boolean logic gates that perform bitwise or other operations on the digital input data stream. Electrical and electronic logic gates are well known to a person of ordinary skill in the electrical and electronics technology, and therefore, are not explained in detail in this disclosure.

Figure 3A:
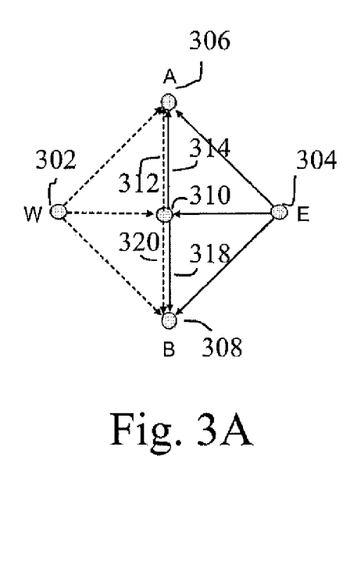
FIGS. 3A-3D illustrate network examples using a digital operator element of the present disclosure.

FIGS. 3A-3D illustrate network examples using a network coding element, also referred to as a digital operator or a digital operator element, of the present disclosure. As described above, the network coding element may be an XOR device, a photonic XOR device, or another device that performs a network coding function. The links connecting the nodes may be optical links. In FIG. 3A, nodes W 302 and E 304 wish to multicast their data streams to nodes A 306 and B 308. To protect these data streams at node A 306 from a single-link failure in a conventional hitless tail-end switching scheme, the node in the middle 310 would repeat, in two separate data channels 312 and 314, the W stream and the E stream, sending these two protection streams simultaneously to node A 306. Likewise, for protecting node B 308, the node in the middle 310 would repeat, in two separate data channels 316 and 318, the W stream and the E stream, sending these protection streams simultaneously to node B 308. It should be understood that while FIGS. 3A-3D show nodes E and W as being in physically separate locations in the drawings, they are shown in separate location only for purposes of simplifying the explanation and understanding. The present disclosure does not limit those nodes to the shown configuration only. Rather, the nodes E and W may be co-located or distant from one another. A node in the present disclosure refers to any system, including any computer software, hardware and/or firmware, that processes and/or communicates (receives and/or transmits) data in a communications network. The nodes may include one or more processors, memory devices and other peripheral devices, including network hardware, firmware, and/or software.

Figure 3B:
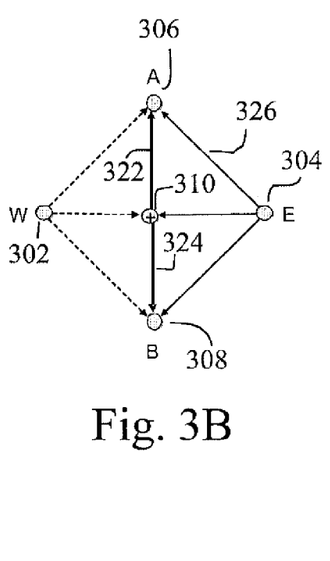

Now consider the network coding solution shown in FIG. 3B. Here the middle node 310 performs a bitwise XOR of the two input streams from W 302 and E 304, and then sends this XOR'ed bit stream to both A 306 and B 308, using a single channel for each. For example, if node A 306 were to lose the direct data stream from E 304 owing to a link failure connecting E and A at 326, then A 306 could still recover the stream from E 304 by XOR'ing (either optically or electronically) the middle node signal with the signal from node W 302. In one embodiment, variable delay lines are provided to compensate for the latency differential between the two paths, incorporating techniques to compensate for thermal drift of that delay. Delay compensation techniques are well-known in connection with synchronous optical networking (SONET) Virtual Concatenation (VCAT) technology.

Figure 3C:
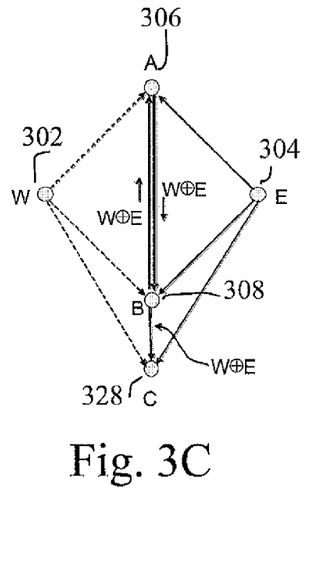

Delay compensation can be better understood by considering the network depicted in FIG. 3C. Let the propagation delays between nodes W and A and between nodes W and B be d1 and d2, respectively. Further, let the propagation delays between nodes E and A and between E and B be d3 and d4, respectively. Finally, let the propagation delay from node B to A be d5. If the signals sent from nodes W and E at time t are W(t) and E(t), respectively, then the delayed signals arriving at node A at time t are W(t−d1) and E(t−d3), respectively. Similarly, the signals arriving at node B at time t are W(t−d2) and E(t−d4), respectively. At nodes A and B, the two multicast signals are temporarily buffered by such means as delay lines or by writing the data into storage media. At node B, the two received signals would be bit-wise time aligned and combined in a bit-wise operation such as exclusive-OR to yield W(t−d2)□E(t−d4) which is then sent to node A (here exclusive-OR is indicated by □). At node A the protection signal arriving from node B is given by W(t−(d2+d5))□E(t−(d4+d5)). If the direct signal from node W is lost at node A, this signal can be restored by performing the XOR operation between the protection signal and a version of the signal sent from node E further delayed by the interval (d4+d5−d3) to give E(t−d3−(d4+d5−d3))=E(t−(d4+d5)). The XOR between the protection signal and the delayed direct signal yields the lost signal from node W: [W(t−(d2+d5))□E(t−(d4+d5))]□E(t−(d4+d5))=W(t−(d2+d5)). Corresponding procedures would be used to recover E at node A or either signal at node B.

Compared to the example shown in FIG. 3A, which uses 10 transmitter/receiver pairs and 10 fiber connections, the network coding solution shown in FIG. 3B accomplishes the same function with only 8 transmitter/receiver pairs and 8 fiber connections, which provides a 20% saving. Note that one or more additional nodes C, similar to A and B and receiving the multicast from both W and E, may be protected the same way by extending links from W, E, and the middle node to C.

In the network coding approach described in FIG. 3B, only one communication link is needed from the central node to A, and one from the central node to B. That is only half the cost in hardware overhead on these communication paths, By creating the bitwise exclusive-OR of the signals from W and E, and then forwarding this new signal to both A and B, the latter two nodes are now protected from losing either the signal from W or E owing to a single-link failure. For example, if node A loses the direct signal from E owing to a failure of the link connecting A and E, then A need only execute the exclusive-OR of the signal from W and the signal from the central node to recover the signal from E, as E=W XOR (W XOR E). Likewise, had node A lost the direct signal from W owing to a single-link failure, then it can recover W by exclusive-OR'ing its remaining two bit streams, as W=E XOR (W XOR E).

Conventional protection techniques may achieve savings in links such as transmitter, fiber or wavelength channel and receiver, but at a cost. For example, a conventional line switching technique could share the single channel between the middle node and A (or B) for protection purposes, but at the cost of a complicated distributed switching protocol; moreover, the switchover would not be hitless. Consider also a packet-oriented case when the packet data streams from W and E underutilize a channel to the extent that the two of them could time-share a single physical channel. If this were true, then only one channel would be needed between the middle node and A (or B). However, the middle node would then require buffering for contention resolution, and attaining the significant amount of buffering needed for reliable contention resolution in all-photonic networks is a difficult task. Moreover, this solution introduces potential queuing delays in the backup path that are beneficially absent in the network coding solution where the notion of contention is not an issue.

FIG. 3C is another example of fault-tolerant network coding solutions of the present disclosure. FIG. 3C shows how the middle node from FIG. 3B can be eliminated. In this embodiment, nodes A 306 and B 308 protect each other, using network coding. For instance, node B 308 sends to node A 306 the XOR combination of the data received from node W 302 and node E 304. Likewise, node A 306 sends to node B the XOR combination of the data received from node W 302 and node E 304. Moreover, node B 308 also protects a third receiving node, C 328, for instance, by sending to node C 328 the XOR combination of the data from W 302 and node E 304. Such protection can be extended to any number of additional receiving nodes. Here 9 links are used, as opposed to 12 for a conventional hitless design, providing a 25% savings.

Figure 3D:
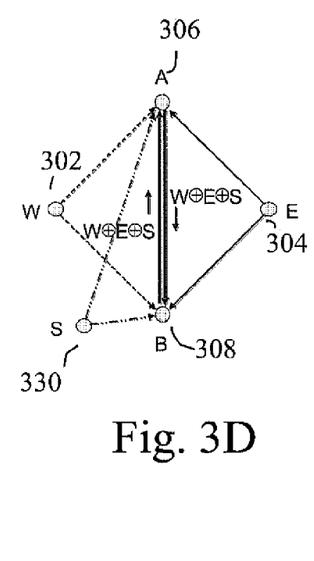

FIG. 3D shows how an additional multicast transmitter S can be added to the network. In this scenario, nodes A 306 and B 308 are designed or configured to protect each other. Both of the nodes A 306 and B 308 receive working data signals from nodes E 304, W 302 and S 330. At node A, the signal corresponding to the XOR of all three signals is sent as a protection signal to node B. Briefly, XOR(E, W, S)=XOR(E, XOR(W, S))=XOR(W, XOR(E,S))=XOR(S, XOR(E, W)). At node B, the signal corresponding to the XOR of all three signals is sent as a protection signal to node A. At node A (or B), the loss of any one of the three working signals from nodes E, W and S can be recovered from the XOR of the two remaining working signals and the protection signal. Protection is achieved with only 8 links, versus 12 for a conventional design (33% saving).

In this disclosure, protection data and protection signal refer to backup or redundant data that is sent to a node to protect against a failure in receipt of the working data. Working data or working data signals refer to data transmitted or communicated in the normal course of network processing. A node that is protected refers to the node that receives both working data and protected data. A node doing the protecting or providing protection refers to the node that combines (e.g., XOR) the multicast data from a plurality of sources and sends the combined data to the protected node.

Which node is protecting which other node is determined as a part of a network layout design and thus, may be predetermined. For example, referring to the example network shown in FIG. 3C, node B is predetermined to protect both node A and node C, while node A is predetermined to protect node B. Thus, at node B, in response to receiving data from W and E nodes, the data are combined (e.g., XOR'ed) at B and transmitted to node C and node A. Similarly, at node A, in response to receiving data from nodes W and E, the data are combined (e.g. XOR'ed) at A and transmitted to node B. In one embodiment, all receiving nodes that are protected include at least one network coding device, for example, an XOR device, photonic XOR element, operator, logic gate or device. Referring again to FIG. 3C, nodes A and B may each include two network coding devices, for example, two XOR devices: one for receiving protected data; and another for sending data to protect a node.

Providing protection using network coding as described above reduces service unavailability relative to an unprotected scenario and comparable to parallel-path protection. Network coding techniques based on a simple bitwise operator (e.g., XOR) element provide efficient, fault-tolerant multicast networks without the need for complicated distributed line-switching protocols or optical buffering for contention resolution. The above-described examples showed savings of up to 33% in links, compared to conventional tail-end switching protection techniques. For a simple network example, the availability penalties of network coding designs compared to conventional fault-tolerant network designs are shown to be modest, provided the reliability of the XOR function is comparable to that of fiber links.

Figure 4:
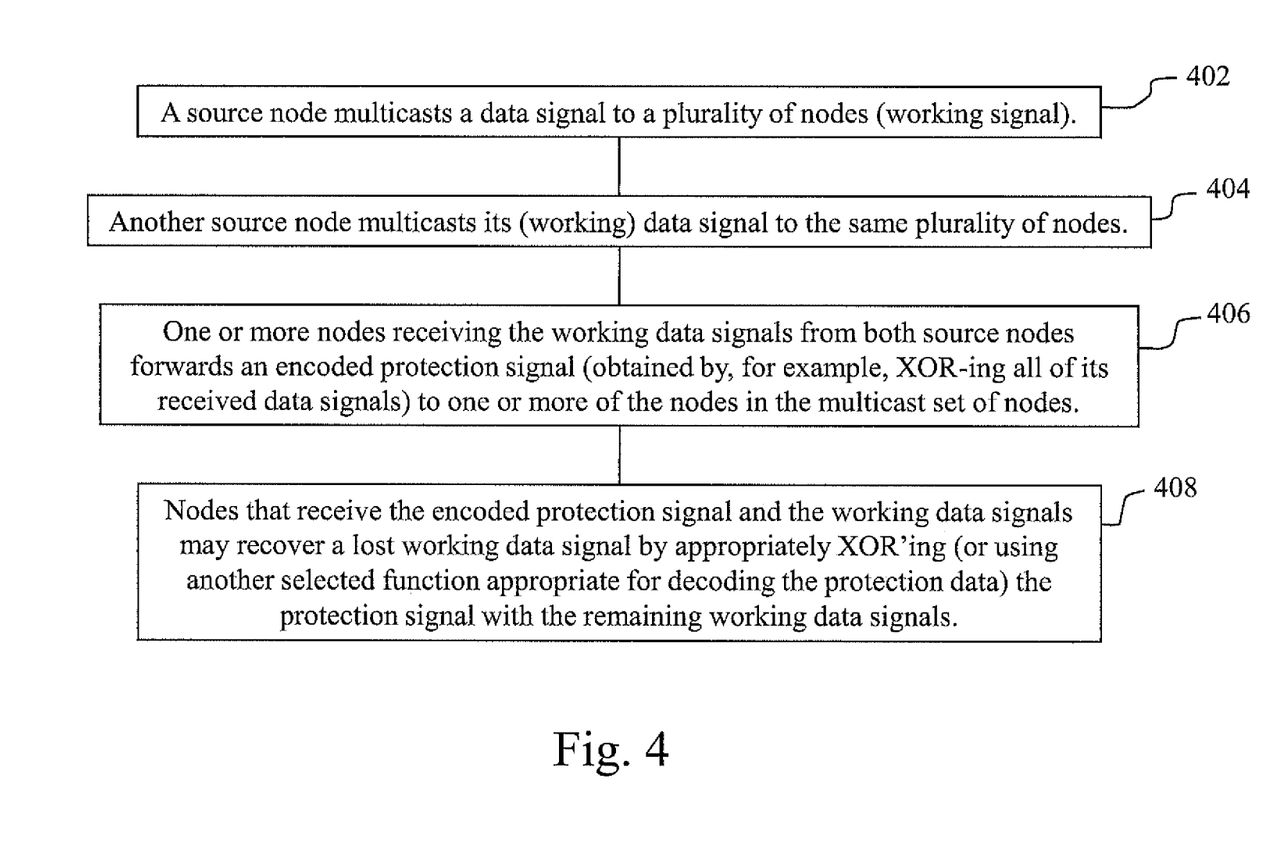
FIG. 4 is a flow diagram illustrating a methodology of using network coding in multicast networks in one embodiment of the present disclosure.

FIG. 4 is a flow diagram illustrating a methodology of using network coding in a multicast network in one embodiment of the present disclosure. At 402, a source node multicasts a data packet to a plurality of nodes. At 404, another source node, referred to herein as a second source node for ease of explanation, also multicasts its data packet to the same plurality of nodes. At 406, one or more nodes, for example, intermediate nodes or destination nodes receiving the data packets from the source node at 402 and the second source node at 404 encodes the data packets and forwards the coded data packet to one or more of the nodes in the multicast group. As described above, the coding in one embodiment may use the XOR Boolean function. At 408, the node that receives the coded data packet may decode the data by XOR'ing the received data. In another embodiment, encoding and decoding functions other than an XOR function may be used. Simple XOR is unique in that the same function both encodes and decodes. A more complicated encoding may use a decoding function that is different from the encoding function. For example, in a ternary system, data may be encoded with mod-3 addition, and decoded using an appropriate function incorporating mod-3 addition but more complicated than simple mod-3 addition of the data stream digits.

Figure 5:
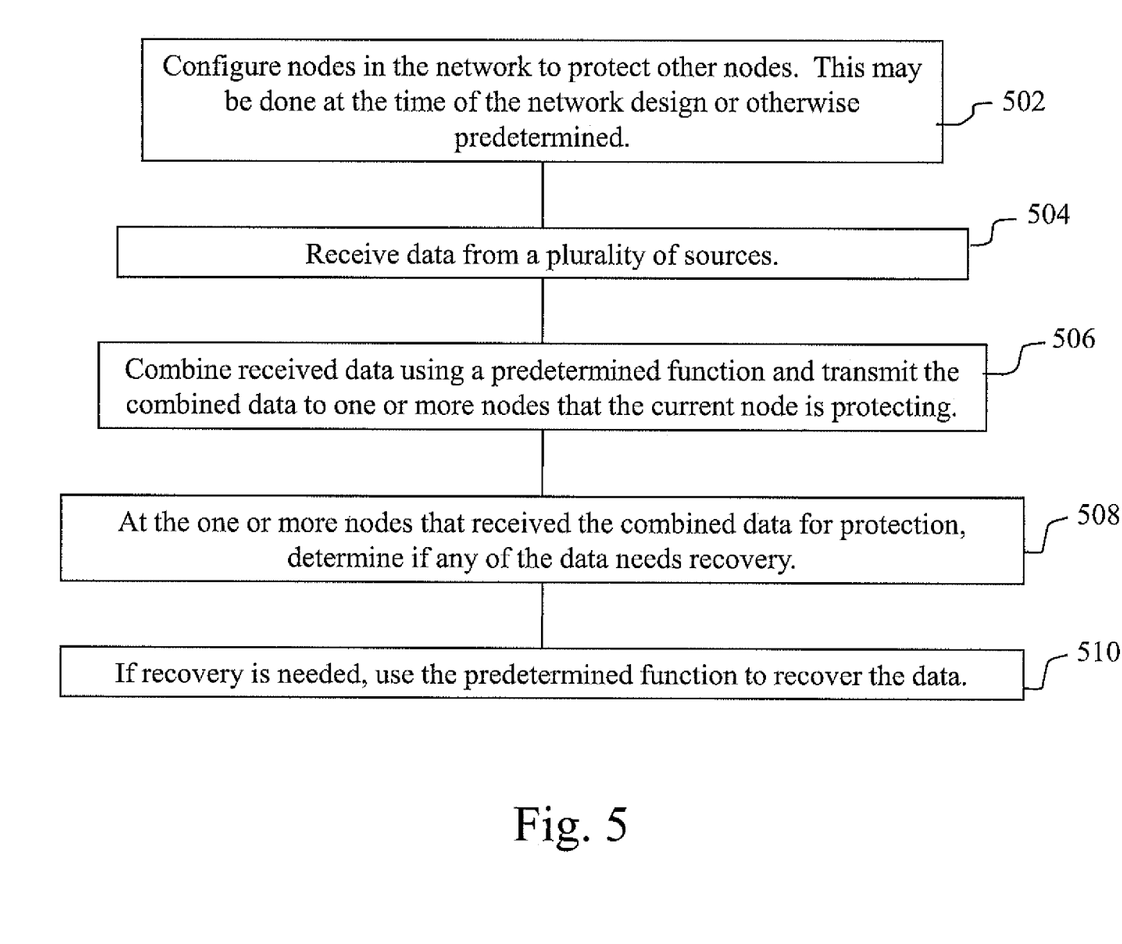
FIG. 5 is a flow diagram that illustrates a method of a node receiving data from more than two sources, and data protection schema according to one embodiment of the present disclosure.

A node may combine data from more than two sources, thus protecting a node that receives data from more than two sources, for instance, as shown in the network configuration example of FIG. 3D. FIG. 5 is a flow diagram that illustrates a method of a node receiving data, for example, from more than two sources, and data protection schema according to one embodiment of the present disclosure. At 502, nodes are configured to protect other nodes. For example, which nodes protect which other nodes may be configured at the time of the network design, i.e., predetermined, and/or modified as needed. At 504, a node (e.g., node A) providing protection to another node (e.g., node B) receives data from a plurality of sources, that is, two or more source nodes. At 506, the node (e.g., node A) combines all data received from different sources, for example, performing photonic bitwise XOR on the data using the photonic XOR device, and transmits the combined data to the node that it is protecting (e.g., node B and/or other nodes). At 508, the node that receives the protected data (e.g., node B) determines whether it needs to recover any one of the data streams that is combined in the protected data. For example, if any one of the links from the sources failed, it may recover the data using the protected data. At 510, if recovery is needed, the protected node (e.g., node B) recovers the data, for example, by XOR'ing the protected data with all other working data it received without failure.

Network encoding and decoding of the present disclosure in one embodiment utilizes the symmetry of binary digital systems where both the encoding function and the decoding function are performed by modulus-2 bitwise addition (i.e., exclusive-OR). In another embodiment, as mentioned above, the method and system of the present disclosure may use encoding and decoding functions other than an exclusive-OR function. For example, consider ternary systems. These are digital systems where three digits (typically denoted 0, 1, and 2) can be sent at any moment of time. Technologically, such systems can be realized by three levels of intensity in a signal, rather than just two levels as is done in binary systems.

In M-ary digital systems (e.g., ternary), the combination of multiple streams may also be encoded by a simple mod-M (e.g., mod-3) addition of the digits of each stream. To recover a lost stream from this combined stream, the decoding function described below may be used. The following describes how network coding in the present disclosure may be done in a general M-ary digital system.

Consider a communication system where the signals encode one of M≥digits at any moment of time. If M=2, we have a traditional binary digital system, and we call the digits encoded for such a system bits. If M=3, we have a ternary system. If M=4, we have a quaternary system, and so forth. The analysis given here applies to any M≥2, and we call such a system an M-ary communication system. Technologically, an M-ary system can be realized by creating both transmitters that can send M distinct signal intensities at any moment of time, and receivers that can discriminate among these M distinct signal intensities at any moment of time. For network coding purposes in support of fault-tolerant multicast of the present disclosure, we form a single stream S by combining k M-ary streams using modulus M addition of the digits:

$$S=(q_1+q_2+q_3+\ldots+q_k)\%M$$

Here $q_1$ denotes the instantaneous M-ary digit on stream i, the + symbol denotes ordinary addition, and the % symbol denotes the modulus operation. In the case of binary systems, M=2, each of the $q_i$ is either zero or one, and the above expression reduces to the familiar exclusive-OR of the bit streams. This follows because the sum in the parenthesis lies between 0 and k, and the %2 operation results in S being either zero or one depending on whether the sum in the parentheses is an even or odd number, respectively. Hence, S is precisely the exclusive-OR of the bits $q_i$ when M=2.

Suppose some node N in the network is receiving each of the k individual M-ary signals $q_i$, along with the combined signal S. Now suppose one of the signals $q_p$ disappears owing to a network failure. We can recover $q_p$ as follows:

$$q_p=(S+(M-q_1)+(M-q_2)+\ldots+(M-q_{(p-1)})+\\(M-q_{(p+1)})+\ldots+(M-q_k))\%M$$

Here the − symbol denotes ordinary subtraction. For binary systems, M=2 and the above expression reduces to the familiar operation of exclusive-ORing the combined signal S with the bits of the k−1 remaining signals. Indeed, if $q_i$=1, then M−$q_i$=2−1=1. So when M=2, the bits $q_i$ that are equal to 1 map to a term (M−$q_i$) in the above expression that is also equal to 1. Moreover, when M=2, the bits $q_i$ that are equal to 0 map to a term that is equal to 2. Adding 2 to a sum preserves its parity, so the %2 operation results in the familiar exclusive-OR recovery of $q_p$ when M=2.

Now consider a ternary example (M=3). Suppose we combine five ternary signals, and at one particular instant of time, their values are, respectively, 2, 1, 2, 0, and 2. So the combined signal S is calculated for that instant of time as indicated in the following expression:

$$S=(2+1+2+0+2)\%3=7\%3=1$$

Suppose we lose reception of the third signal $q_3$ (whose value is 2 at this instant) and wish to recover it using S and the remaining signals. From the recovery expression, we obtain $q_3$=(1+(3−2)+(3−1)+(3−0)+(3−2)%3=(1+1+2+3+1) %3=8%3=2, which is the correct answer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or steps plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known system and may typically include a processor, memory device, a storage device, input/ output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, or server. A module may be a component of a device, software, program, or system that implements some "functionality," which can be embodied as software, hardware, firmware, electronic circuitry, etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for providing a fault-tolerant digital multicast all-optical network that transports and routes signals completely in an optical domain, comprising:
    receiving at a node having a digital operator, first data multicast from a first source to at least a first receiving node and a second receiving node;
    receiving at the node second data multicast from a second source to at least the first receiving node and the second receiving node;
    combining the first data and the second data using the digital operator at the node;

sending combined first data and second data at least to the first receiving node via a link between the node and the first receiving node;

buffering the second data and the combined first data and second data at the first receiving node; and recovering the first data by performing a decoding function on buffered second data and buffered combined first data and second data at the first receiving node;

wherein the node, the first source, the second source, the first receiving node and the second receiving node are nodes of the all-optical network which maintain the signals as light from input to output without optical-electrical-optical (OEO) conversion.

2. The method of claim 1, further comprising:
sending the combined first data and second data to the second receiving node via a link between the node and the second receiving node.

3. The method of claim 1, wherein the digital operator includes a bitwise exclusive-OR logic gate.

4. The method of claim 1, wherein the digital operator includes a photonic bitwise exclusive-OR logic gate.

5. The method of claim 1, wherein the digital operator includes an M-ary operator device.

6. The method of claim 1, wherein the digital operator includes an M-ary operator device and wherein the first data is recovered at the first receiving node by using a corresponding M-ary decoding function.

7. The method of claim 1, further comprising:
receiving at the node third data multicast from a third source to at least the first receiving node, the second receiving node and a third receiving node;
combining the first data, the second data and the third data using the digital operator at the node; and
sending combined first data, second data and third data at least to the first receiving node via the link between the node and the first receiving node.

8. The method of claim 7, further comprising:
buffering the second data, the third data and the combined first data, second data and third data at the first receiving node; and
recovering the first data by performing the decoding function on the buffered second data, buffered third data and buffered combined first data, second data and third data at the first receiving node.

9. The method of claim 1, wherein the decoding function performs a modular arithmetic operation for recovering the first data at the first receiving node.

10. A fault-tolerant digital multicast all-optical network system that transports and routes signals completely in an optical domain, comprising:
a plurality of nodes receiving and sending data, the plurality of nodes including at least a first receiving node, a second receiving node, a first source and a second source which maintain the signals as light from input to output without optical-electrical-optical (OEO) conversion;
a digital operator element implemented in at least one of the plurality of nodes, the digital operator element operable to combine first data multicast from the first source to at least the first receiving node and the second receiving node and second data multicast from the second source to at least the first receiving node and the second receiving node, wherein combined first data and second data is sent to the first receiving node via a link between the at least one of the plurality of nodes and the first receiving node;
a storage device operable to buffer at least the second data received at the first receiving node, and
a second digital operator implemented at the first receiving node operable to recover the first data by performing a decoding function on buffered second data with the combined first data and second data.

11. The system of claim 10, wherein the digital operator element includes a bitwise exclusive-OR logic gate.

12. The system of claim 10, wherein the digital operator element includes a photonic bitwise exclusive-OR logic gate.

13. A non-transitory program storage device readable by a machine, tangibly embodying a program of instructions executable by the machine to perform a method of providing a fault-tolerant multicast all-optical network that transports and routes signals completely in an optical domain, comprising:
receiving at a node having a digital operator, first data multicast from a first source to at least a first receiving node and a second receiving node;
receiving at the node second data multicast from a second source to at least the first receiving node and the second receiving node;
combining the first data and second data using the digital operator at the node;
sending combined first data and second data at least to the first receiving node via a link between the node and the first receiving node which maintain the signals as light from input to output without optical-electrical-optical (OEO) conversions;
buffering the second data and the combined first data and second data at the first receiving node; and
recovering the first data by performing a decoding function on buffered second data and buffered combined first data and second data at the first receiving node.

14. The program storage device of claim 13, further comprising:
sending the combined first data and second data to the second receiving node via a link between the node and the second receiving node.

15. The program storage device of claim 13, wherein the digital operator includes a bitwise exclusive-OR logic gate.

16. The program storage device of claim 13, wherein the digital operator includes an M-ary operator device.

17. The program storage device of claim 13, further comprising:
receiving at the node third data multicast from a third source to at least the first receiving node, the second receiving node and a third receiving node;
combining the first data, the second data and the third data using the digital operator at the node; and
sending combined first data, second data and third data at least to the first receiving node via the link between the node and the first receiving node.

18. The method of claim 17, further comprising:
buffering the second data, the third data and the combined first data, second data and third data at the first receiving node; and
recovering the first data by performing a decoding function on the buffered second data, buffered third data and buffered combined first data, second data and third data at the first receiving node.

19. The program storage device of claim 13, wherein the decoding function performs a modular arithmetic operation for recovering the first data at the first receiving node.

20. A method for providing a fault-tolerant digital multicast all-optical network that transports and routes signals completely in an optical domain, comprising:
receiving at a node having a digital operator, a plurality of data multicast from a plurality of source nodes;

combining the plurality of data using the digital operator;

transmitting combined data to one or more protected nodes, the one or more protected nodes configured to be protected by the node;

buffering the plurality of data at the one or more protected nodes; and determining if one of buffered plurality of data at the one or more protected nodes should be recovered and, if so, combining the combined data with at least another one of the buffered plurality of data to recover the one of the buffered plurality of data.

21. A method for providing a fault-tolerant multicast all-optical network that transports and routes signals completely in an optical domain, comprising:

receiving at a node having a digital operator, a plurality of data streams multicast from a plurality of source nodes;

receiving at the node a protected data stream;

buffering the plurality of data streams; and recovering one of the plurality of data streams multicast from the plurality of source nodes by using the digital operator to perform a predetermined digital operation on the plurality of data streams that are buffered and the protected data stream.

22. The method of claim 21, wherein the digital operator includes an exclusive-OR logic device.

* * * * *

UNITED STATES PATENT AND TRADEMARK OFFICE
CERTIFICATE OF CORRECTION

| | | |
|---|---|---|
| PATENT NO. | : 8,929,365 B2 | Page 1 of 1 |
| APPLICATION NO. | : 12/390946 | |
| DATED | : January 6, 2015 | |
| INVENTOR(S) | : Menendez et al. | |

It is certified that error appears in the above-identified patent and that said Letters Patent is hereby corrected as shown below:

In the Specification

In Column 6, Line 32, delete "paths," and insert -- paths. --, therefor.

In Column 9, Line 2, delete "M≥digits" and insert -- M≥2 digits --, therefor.

In Column 9, Line 17, delete "$q_1$" and insert -- $q_i$ --, therefor.

In Column 9, Line 55, delete "(3-2)%3=" and insert -- (3-2))%3= --, therefor.

In Column 10, Line 11, delete "invention" and insert -- invention. --, therefor.

In the Claims

In Column 12, Line 21, in Claim 13, delete "second" and insert -- the second --, therefor.

In Column 12, Line 52, in Claim 18, delete "method of claim" and insert -- program storage device of claim --, therefor.

Signed and Sealed this
Thirtieth Day of June, 2015

Michelle K. Lee
*Director of the United States Patent and Trademark Office*